(12) United States Patent
Neumeier et al.

(10) Patent No.: US 7,223,163 B2
(45) Date of Patent: May 29, 2007

(54) COVER DEVICE FOR A POWER TOOL

(75) Inventors: Michael Neumeier, Steingaden (DE); Rolf Spangenberg, Gauting (DE)

(73) Assignee: Hilti Aktiengesellschaft, Schaan (LI)

( * ) Notice: Subject to any disclaimer, the term of this patent is extended or adjusted under 35 U.S.C. 154(b) by 65 days.

(21) Appl. No.: 11/232,184

(22) Filed: Sep. 20, 2005

(65) Prior Publication Data
US 2006/0067798 A1    Mar. 30, 2006

(30) Foreign Application Priority Data
Sep. 29, 2004    (DE)    ...................... 10 2004 047 277

(51) Int. Cl.
    *B24B 55/04*    (2006.01)
(52) U.S. Cl. ........................ 451/451; 451/456; 451/457
(58) Field of Classification Search ........ 451/451–457; 83/814–820; 144/251.1–252.2; 74/608–612
    See application file for complete search history.

(56) References Cited

U.S. PATENT DOCUMENTS 5,931,072 A * 8/1999 Shibata ........................... 83/98

| | | | |
|---|---|---|---|
| 6,375,557 B1 | 4/2002 | Spangenberg et al. | |
| 6,886,259 B2 * | 5/2005 | Kani | 30/376 |
| 7,131,897 B2 * | 11/2006 | Crover | 451/311 |

FOREIGN PATENT DOCUMENTS

| DE | 1804220 | 11/1960 |
|---|---|---|
| DE | 0052796 | 12/1966 |
| DE | 9005339 | 8/1990 |
| DE | 4017405 | 12/1991 |
| DE | 9403777 | 9/1994 |

* cited by examiner

*Primary Examiner*—Dung Van Nguyen
(74) *Attorney, Agent, or Firm*—Abelman, Frayne & Schwab

(57) ABSTRACT

A cover device for partially covering a disc-shaped working tool includes a bearing member (22) forming a receiving space (54) for receiving the shielding member (10) of the working tool and having an inner surface (24) against which an outer surface of the shielding member (10) lies when received in the receiving space (54), and a pivot member (48) supported on the bearing member (22) for a pivotal movement about a pivot axis (S1) between a locking position in which the receiving space (54) is limited at both ends in tangential and axial directions and is at least partially limited outwardly in a radial direction, and an open position in-which the receiving space (54) is open in at least one of the axial direction and the tangential direction.

9 Claims, 3 Drawing Sheets

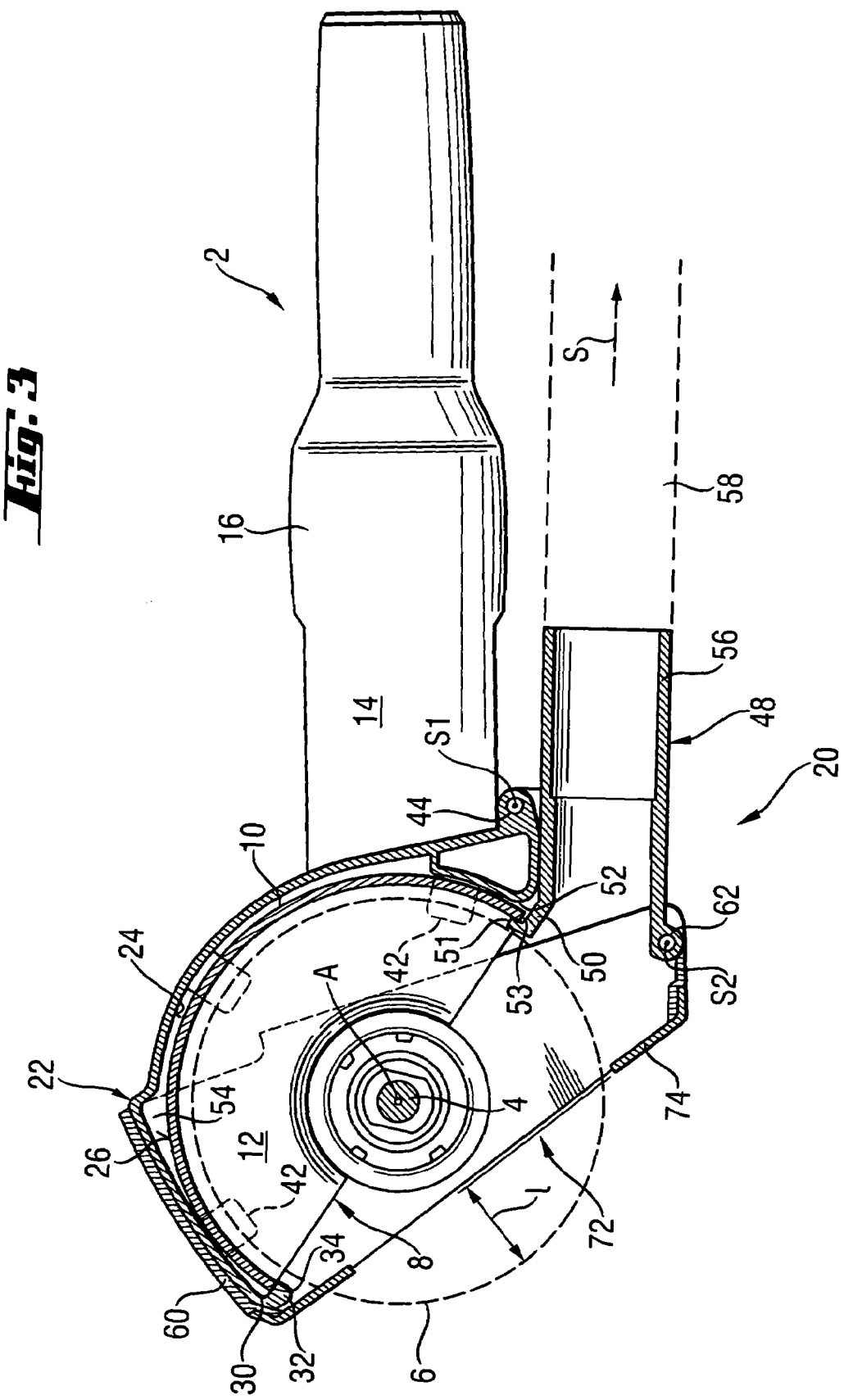

COVER DEVICE FOR A POWER TOOL

BACKGROUND OF THE INVENTION

1. Field of the Invention

The present invention relates to a cover device for partially covering a disc-shaped grinding or cutting tool of a power tool, in particular of an angular grinder in frontal axial direction and including a bearing member forming a receiving space in which a strip-shaped shielding member that partially radially covers the working tool is received. The receiving space has an inner surface against which an outer surface of the shielding member lies when it is received in the receiving space. The cover device further has a pivot member supported on the bearing member for a pivotal movement about an axis.

2. Description of the Prior Art

The cover devices of the type described above and which are formed of at least two parts, can be placed, if needed, on a shielding member of a power tool which is formed, as a rule, as a protective plate, for better covering the working tool during operation. With an improved covering of the working tool, on one hand, a better protection of the tool operator against accelerated, removable material particles, in particular, sparks, is achieved. On the other hand, the cover device which covers a major portion of the working tool, enables an effective suction of the produced material particles by connecting a suction device such as, e.g., an industrial vacuum cleaner, with the cover device.

German Utility Model DE 94 03 777 discloses a protection device for an angular grinder. The device has a shielding disc which is forcelockingly secured with a surface element on a strip-shaped protection element of the angular grinder. A cover is pivotally arranged on the shielding disc. During an operation, the cover, by being pressed against a workpiece, pivots against a biasing force in the direction of the shielding disc, releasing the working tool. Upon removing the power tool from the workpiece, the cover is pressed by a spring force away from the shielding disc. Thereby, a region of the power tool, accessible from outside, is noticeably reduced.

The known protection device insures a good protection of the operator against accelerated material particles and an effective removal by suction of material particles upon connection with a suction device.

A drawback of the known protection and cover device consists in that the conventional means for forcelockingly connecting the cover or protection device with the power tool such as, e.g., stop screws, can be accessed with much difficulty. Moreover, many known forcelocking connection means are not capable to absorb forces such as, e.g., tangentially acting blows, which act on the cover device during operation, without displacing the cover device relative to the power tool.

Accordingly, an object of the present invention is to provide a cover device in which the drawbacks of the known device are eliminated, and which would insure rapid mounting and dismounting the device on and from the power tool and a reliable holding of the cover device on the power tool.

SUMMARY OF THE INVENTION

This and other objects of the present invention, which will become apparent hereinafter, are achieved by providing a pivot member pivotable about a pivot axis between a locking position in which the receiving space is limited at both ends in tangential and axial directions and is at least partially limited outwardly in a radial direction, and an open position in which the receiving space is open in at least one of the axial direction and the tangential direction, so that the shielding member can move in and out.

In accordance with the present invention, the cover device is formlockingly connectable with the shielding member, which insures a reliable retention of the cover device on the power tool. Further, because of the curved shape of the receiving space and/or the shielding member, a formlocking connection is achieved in the inward radial direction independent from whether the receiving space is at least partially closed radially inward or not. The pivotability of the pivot member relative to the bearing member insures rapid mounting or dismounting of the cover device.

According to a particularly advantageous embodiment of the present invention, the pivot member is formed as a suction connection member and has a connection element to which a suction conduit for connecting the cover device with a suction flow generator can be connected. In this way, the pivot member provides for both a formlocking connection with the shielding member and for connection with a suction device. Thereby, the cover device can be made compact and relatively stable.

Advantageously, the bearing member has a first tangential bearing element provided at a first tangential end of the inner surface. The first tangential bearing member is engageable with a first tangential limiting end of the shielding member. The pivot member is provided with a second tangential bearing element positionable on a second tangential end of the inner surface upon rotation of the bearing member. In this way, the second tangential bearing member engages the second tangential limiting end which engagement takes place opposite the engagement at the first tangential limiting end. Thereby, the cover device can be completely formlockingly secured with its inner surface in both tangential directions and also in the radial direction due to cooperation of the tangential bearing means with the inner surface.

Advantageously, the receiving space is limited in the axial direction by a shielding disc extending substantially perpendicular to the inner surface which partially covers a front side of the working tool and which limits the receiving space, on one hand, and by an engagement fishplate which limits the receiving space, on the other hand, and which engages from behind the shielding member. In this way, with a simple construction, a reliable formlocking connection of the cover device with the shielding member is achieved at both sides in the axial direction.

Advantageously, the pivot member is secured to the bearing member with securing means which insures a reliable retention of the formlocking connection of the cover device with the shielding member during an operation.

The securing means has a locking member supported on the pivot member for pivotal movement about a second pivot axis and which is provided with locking means cooperating with counterlocking means provided on the bearing member.

According to a further particularly advantageous embodiment of the present invention, the locking member has an opening through which the working tool is extendable and which bears against the to-be-treated workpiece. This permits to use the locking member as a bearing element and provides for a good integration of the locking member into the cover device.

It is beneficial when the locking means is formed as a locking nose, and the counterlocking means has a plurality of recesses. The locking means further includes a spring arm for preloading the locking nose against the recesses, with the locking nose being engageable with a respective one of the plurality of recesses. Thereby, the pivot member can be secured in a simple manner in different positions relative to the bearing member to provide for the predetermined depth of a to-be-made cut.

It is further advantageous when a slide shoe is provided on the opening, in particular a slide shoe formed of metal. The slide shoe insures an easy and uniform sliding movement of the cover device over the to-be-treated workpiece and reduces wear.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a cross-sectional view of the cover device according to the present invention in a locking position thereof.

DETAILED DESCRIPTION OF THE PREFERRED EMBODIMENT

Figure 1:
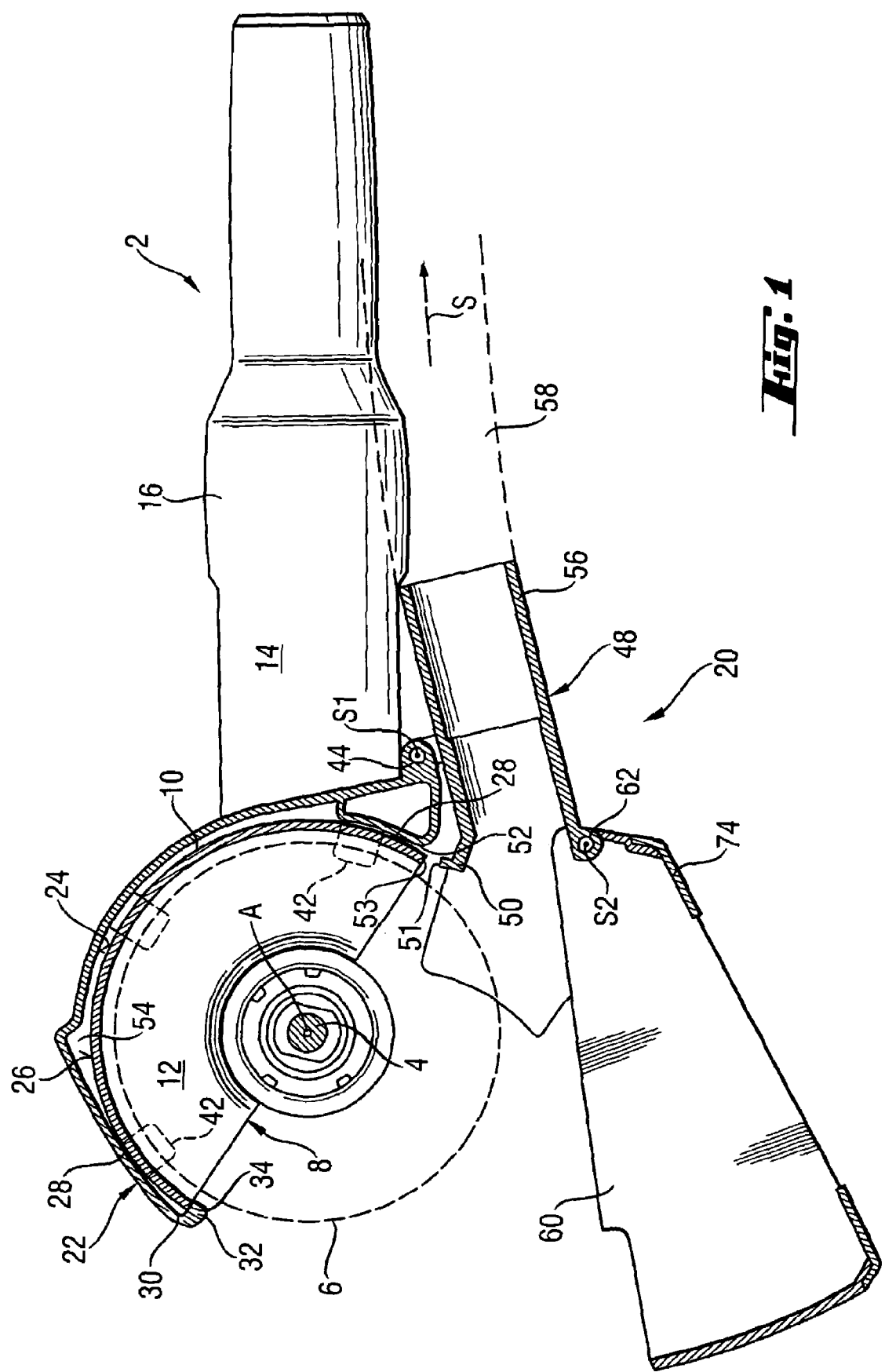
FIG. 1 a side view of a power toll with a cover device according to the present invention shown in cross-section and in an open position.

FIG. 1 shows a power tool 2 that is formed as an angular grinder and has a spindle 4 rotatable about an axis A and on which a disc-shaped grinding or cutting tool 6 is fixedly secured.

In order to protect a tool operator from removable material particles, which are accelerated in the radial direction of the tool 6 during operation of the power tool 2, the power tool 2 is provided with a shielding attachment 8. The shielding attachment 8 is formed by a strip-shaped shielding member 10 that partially surrounds the tool 6 in radial direction in form of a circular arch. The shielding member 10 is secured on the tool side 14 of the housing 16 of the power tool 2 over a connection region 12 of the shielding attachment 8 formed as a cutout of a truncated cone. The shielding attachment 8 partially surrounds the tool spindle 4 that projects out of the housing 16 on the tool side 14.

A cover device 20 is placed on the shielding attachment 8. The cover device 20 includes a bearing part 22 having an inner surface 24 that has a substantially arcuate elongate section which is regionwise adapted in shape and size to a radially outer surface 26 of the shielding member 10, with the shielding member 10 forming, in the radial direction, two contact regions 28.

Further, the bearing part 22 has, at a first tangential end 30 of the inner surface 24, first tangential bearing element 32 formed as an extending radially inward projection. As shown in FIG. 1, a first tangential limiting edge 34 of the shielding member 10 abuts the first tangential bearing element 32 in the tangential direction.

Figure 2:
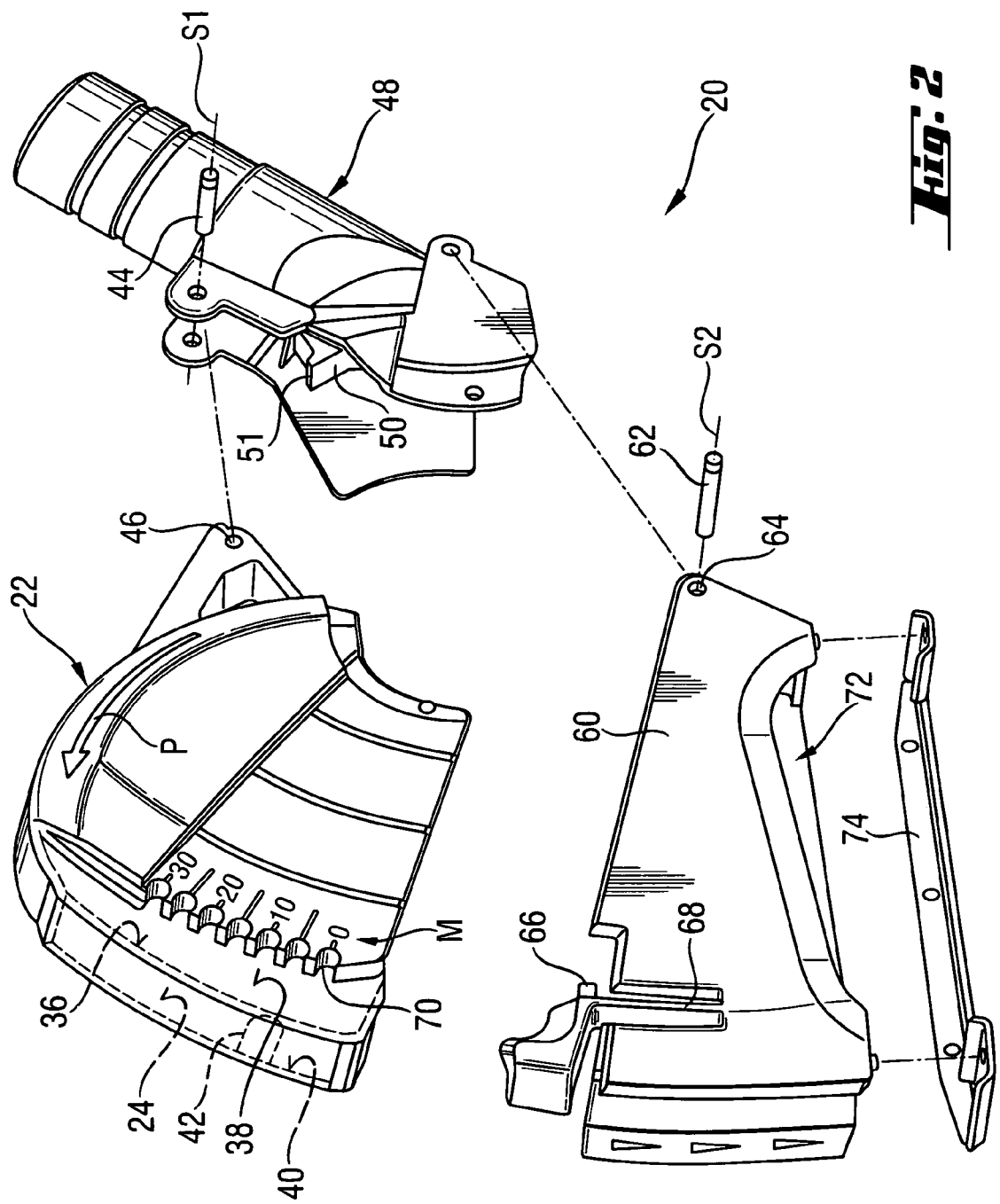
FIG. 2 a perspective exploded view of the cover device shown in FIG. 1.

As shown in FIG. 2, a shielding disc 38 extends from a front side edge 36 of the inner surface 24 substantially perpendicular to the inner surface 24. At the rear side edge 40 remote from the front side edge 36, there are provided, as shown in FIG. 1, three engagement fishplates 42 which likewise extend substantially perpendicular to the inner surface 24.

As further shown in FIG. 2, a pivot member 48 is supported on the bearing part 22 for a pivotal movement about a first pivot axis S1 by a first support pin 44 held in a receptacle 46. The pivot member 48 includes a second tangential bearing element 50 positionable, by being pivoted with the pivot member 48, at a second tangential end 52 of the inner surface 24, e.g., in a spaced relationship relative to the second tangential end 52.

The second tangential bearing element 50 is engageable with a second tangential limiting edge 53 of the shielding member 10. To this end the second tangential bearing element 50 is provided with a projecting inward, engaging from behind, element 51.

The second tangential bearing element 50 essentially closes a receiving space 54 defined by the bearing part 22 and having essentially a shape of an arcuate strip and adapted, in shape and size, to the shielding member 10 for receiving the same.

FIG. 1 shows the cover device 10 in an open position in which the pivot member 48 is pivoted away from the bearing part 22. The receiving space 54 is at least partially limited in the axial direction, by the engagement fishplates 42, on one hand, and by the shielding disc 38, on the other hand, is limited in the radial direction, outwardly, by the inner surface 24 of the bearing part 22, and is limited in one of two tangential directions, by the first tangential bearing element 32.

Thus, in the open position of the cover device 20, the bearing part 22 can be pushed over the shielding member 10 or be removed away from it by being rotated relative to the shielding attachment 8.

FIG. 3 shows the cover device 20 in a position in which it is secured on the shielding attachment 8. In this position, the second tangential bearing element 50 is positioned on the second tangential end 52 of the inner surface 24 of the bearing member 22. As a result, the receiving space 54 is limited at both sides not only in the axial direction but also in the tangential direction. In this way, the shielding member 10, which is received in the receiving space 54 of the bearing member 22, is formlockingly secured in the tangential and axial directions, and also is secured at both sides in the radial direction due to a curved shape of the receiving space 54. The engaging from behind means 51 engages, in the secured position of the shielding member 10, from behind the second tangential limiting edge 53. Thereby, a certain locking of the shielding member 10 is achieved as a result of the pivot member 48 being held with a limited holding force on the bearing member 22.

The pivot member 48 has a union-shaped connection element 56 to which a suction conduit 58 can be connected. The suction conduit 58 can connect the interior of the cover device 20 with a suction flow generator, not shown, e.g., with a conventional industrial vacuum cleaner producing a suction flow S.

For securing the pivot member 48 in the locking position, there is provided, as particular shown in FIG. 2, a locking member 60 supported for a pivotal movement about a second pivot axis S2 by a second support pin 62 received in the second pin receptacle 64 in the pivot member 48. The locking member 60 is so formed that in the locking position, it is positioned in the second bearing element 50 at the second tangential end 52, so that the bearing member 22 is engaged from behind by the pivot member 48, as shown in FIG. 3.

The locking member 60 is provided, as shown in FIG. 2, with locking means 66 which is held on a spring arm 68 and is formed as a nose engageable with a plurality of counterlocking elements formed as a plurality of recesses which are dimensioned so that they correspond to the locking means 66 and which are provided on the shielding disc 38.

As further shown in FIG. 2, the locking member 60 has an opening 72 through which the working tool 6 can project out of the cover device 20, as shown with dash lines in FIG. 3. On the opening 72, there is provided a metal slide shoe 74 that at least partially surrounds the opening 72 and with which the cover device 20 engages a workpiece, which is being treated, during operation of the tool.

For securing the cover device 20 on the shielding member 10, the shielding member 10 is placed in the receiving space 54 in the open position of the cover device 20, and is placed with its outer surface 26 against the inner surface 24 of the bearing member 22. Then, the pivot member 48 is pivoted into the locking position, with the second bearing element 50 being positioned on the second tangential end 52, whereby the receiving space 54 becomes closed. With the engaging-from-behind element 51 a temporary clamping of the pivot member 48 against the bearing member 22 in the locking position is achieved. The final locking of the cover device 20 in the locking position is provided by engagement the locking means 66 in one of the matching counterlocking recesses 70.

Dependent on with which counterlocking recess 70, the locking means 66 cooperates, a length 1, over which the working tool 6 projects out of the cover device 20, is determined, as it is shown in FIG. 3. The length 1 corresponds, e.g., to a cutting depth that can be achieved at respective locking positions of the cover device 20. The length 1, as it now should be clear, is determined by cooperation of locking means 66 and counterlocking means and should correspond to a predetermined cutting depth. The cutting depths are indicated with a reference M at each second counterlocking recess 70.

The direction of the predetermined rotational movement of the working tool 6 is indicated on the bearing member 22 with arrow P.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A cover device for partially covering a disc-shaped working tool (6) of a power tool (2), which is partially radially covered with a strip-shaped shielding member (10), in a frontal axial direction, the cover device comprising:

a bearing member (22) forming a receiving space (54) for receiving the shielding member (10) and having an inner surface (24) against which an outer surface of the shielding member (10) lies when received in the receiving space (54); and a pivot member (48) supported on the bearing member (22) for a pivotal movement about a pivot axis (S1) between a locking position in which the receiving space (54) is limited at both ends in tangential and axial directions and is at least partially limited outwardly in a radial direction, and an open position in which the receiving space (54) is open in at least one of the axial direction and the tangential direction.

2. A cover device according to claim 1, wherein the pivot member (48) is formed as a suction connection member and has a connection element (56) to which a suction conduit (58) for connecting the cover device 20 with a suction flow generator can be connected.

3. A cover device according to claim 1, wherein the bearing member (22) has a first tangential bearing element (32) provided at a first tangential end (30) of the inner surface (24), and the pivot member (48) is provided with a second tangential bearing element (50) positionable on a second tangential end (52) of the inner surface (24).

4. A cover device according to claim 1, further comprising a shielding disc (38) extending substantially perpendicular to the inner surface (24) which partially covers a front side of the working tool (6) and which limits the receiving space (54), on one hand, and an engagement fishplate (42) which limits the receiving space (54), on the other hand, and which engages from behind the shielding member (10).

5. A cover device according to claim 1, further comprising locking means for securing the pivot member (48) against the bearing member (22) in the locking position of the cover device.

6. A cover device according to claim 5, wherein the locking means comprises a locking member (60) supported on the pivot member (48) for pivotal movement about a second pivot axis (S2) and which is provided with locking means (66) cooperating with counterlocking means (70) provided on the bearing member (22).

7. A cover device according to claim 6, wherein the locking member (60) has an opening (72) through which the working tool (6) is extendable and which bears against the to-be-treated workpiece.

8. A cover device according to claim 7, further comprising a slide shoe (74) provided on the opening (72).

9. A cover device according to claim 6, wherein locking means (66) of the locking member (60) is formed as a locking nose, and the counterlocking means (70) has a plurality of recesses, and wherein the locking means further includes a spring arm (68) for preloading the locking nose against the recesses, with the locking nose being engageable with a respective one of the plurality of recesses.

* * * * *